(12) United States Patent
Yamaguchi et al.

(10) Patent No.: US 8,373,128 B2
(45) Date of Patent: Feb. 12, 2013

(54) OPTICAL RANGING SENSOR AND ELECTRONIC DEVICE

(75) Inventors: Akifumi Yamaguchi, Osaka (JP); Masaru Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 12/641,007

(22) Filed: Dec. 17, 2009

(65) Prior Publication Data

US 2010/0230599 A1    Sep. 16, 2010

(30) Foreign Application Priority Data

Mar. 16, 2009   (JP) ................................. 2009-062831

(51) Int. Cl.
  *G01J 5/02* (2006.01)
(52) U.S. Cl. ...................................................... 250/351
(58) Field of Classification Search .................. 250/351, 250/201.6, 238, 201.4; 356/5.03; 396/89
  See application file for complete search history.

(56) References Cited

U.S. PATENT DOCUMENTS

| | | | | |
|---|---|---|---|---|
| 4,678,323 | A | * | 7/1987 | Sato et al. ..................... 356/4.07 |
| 4,835,561 | A | * | 5/1989 | Matsui ............................ 396/93 |
| 5,068,540 | A | * | 11/1991 | Tsuji ........................ 250/559.38 |
| 6,956,607 | B2 | | 10/2005 | Mizuno et al. |
| 7,009,690 | B2 | * | 3/2006 | Kamon et al. ..................... 356/3 |
| 7,995,189 | B2 | * | 8/2011 | Yamaguchi et al. .......... 356/3.01 |
| 2007/0099574 | A1 | * | 5/2007 | Wang .......................... 455/67.11 |
| 2007/0210267 | A1 | * | 9/2007 | Ishii et al. ................. 250/559.36 |
| 2009/0296997 | A1 | * | 12/2009 | Rocheford ..................... 382/124 |

FOREIGN PATENT DOCUMENTS

| | | |
|---|---|---|
| JP | 9-318315 A | 12/1997 |
| JP | 10-148520 A | 6/1998 |
| JP | 2002-195807 A | 7/2002 |
| JP | 2003-130611 A | 5/2003 |
| JP | 2008-157718 A | 7/2008 |
| WO | WO 01/11870 A1 | 2/2001 |

* cited by examiner

*Primary Examiner* — David Porta
*Assistant Examiner* — Edwin Gunberg
(74) *Attorney, Agent, or Firm* — Birch, Stewart, Kolasch & Birch, LLP

(57) ABSTRACT

An optical ranging sensor includes an infrared LED encapsulated in a first light-permeable resin section, a light receiving device encapsulated in a second light-permeable resin section, a light-shielding resin member in contact with the first and second resin sections, a drive circuit section for driving the LED, a light receiving device control section for controlling the light receiving device, and a control section for the drive circuit section and light receiving device control section. Under control of the control section, a driving time of the LED coincides with an exposure time of the light receiving device. Further, while the LED is not driven, the light receiving device is also exposed for a time identical to the exposure time. An output difference between outputs at the exposure with driving the LED and at the exposure without driving the LED is calculated, and ranging is performed based on the output difference.

7 Claims, 7 Drawing Sheets

INFRARED LED
LIGHT EMISSION

EXPOSURE

INFRARED LED
LIGHT EMISSION

EXPOSURE

AMOUNT OF
LIGHT RECEIVED

ACCUMULATION
OF DIFFERENCES
BETWEEN AMOUNTS
OF LIGHT RECEIVED

OPTICAL RANGING SENSOR AND ELECTRONIC DEVICE

TECHNICAL FIELD

The present invention relates to an optical ranging sensor. The present invention also relates to electronic devices having an optical ranging sensor, more particularly to personal computers having an optical ranging sensor, mobile phones having an optical ranging sensor, and the like.

BACKGROUND ART

FIG. 12 is a top view of a conventional optical ranging sensor, and FIG. 13 is a cross sectional view of FIG. 12 taken along an A-A line.

As shown in FIG. 13, the optical ranging sensor includes one light emitting device 101, one PSD (Position Sensitive Detector) 102 which is a light receiving device for position detection, a light emitting-side lens 103, a light receiving-side lens 104, and one IC (Integrated Circuit) 105 which is configured to process a signal outputted from the PSD 102 and drive the light emitting device 101 at a predetermined timing. The PSD 102 has only one light receiving section, and a resistance of the light receiving section is uniform and constant within the light receiving section.

In the case where ranging is conducted based on triangulation by the conventionally-structured optical ranging sensor, because this optical ranging sensor has only one light receiving section in the PSD 102 (see FIG. 13) and the resistance of the light receiving section is uniform and constant within the light receiving section, distance measurement precision is deteriorated when a distance to an object is long as explained later.

FIG. 14 is a view for explaining the principle of the triangulation system.

It is to be noted that in FIG. 14, a relation of $X=A \cdot (f/d)$ holds, where X represents a size of an image, A represents a center-to-center distance between the light emitting-side lens 103 and the light receiving-side lens 104, f represents a focal length of the light receiving-side lens 104, and d represents a distance from a plane including the center of the light emitting-side lens 103 to an object 100.

In the optical ranging sensor which detects the distance d to the object 100 by the triangulation system, the distance d to the object 100 is in inverse proportion to an output V of the PSD 102, i.e., the size X of an image as shown in FIG. 16.

Therefore, when the distance d to an object is short, change in an output V due to distance fluctuation is large, whereas when the distance d to an object is long, change in an output V due to distance fluctuation becomes small, i.e., when the distance d to an object is short, distance measurement can be performed with sufficient precision, whereas when the distance d to an object is long, distance measurement is performed with poor precision.

In the triangulation system, the ranging precision depends on the center-to-center distance A between the light emitting-side lens 103 and the light receiving-side lens 104, and on the focal length f of the light receiving-side lens 104. More specifically, distance measurement precision is enhanced by increasing A and f. However, this entails a problem of increase of the size of the optical ranging sensor.

Moreover, when the distance d to an object is long, it is necessary to increase a lens diameter so as to prevent an insufficient light amount, and this may also cause the problem of increase of the size of the optical ranging sensor.

JP 2002-195807 A discloses an optical ranging sensor with use of a CMOS image sensor as a position detecting element. However, in this optical ranging sensor, the light emitting device and the light receiving device are not provided on the same plane and every element is independently packaged, which also causes the increase in size of the ranging sensor. In addition, a processing section for processing a signal taken out from the CMOS image sensor and a drive circuit section for driving the light emitting device are placed outside of a CMOS image sensor chip, and not all the elements and regions are mounted in one chip, which causes further increase in size of the ranging sensor. Furthermore, manufacturing of the optical ranging sensor needs a large number of process steps, and operation in each process step is complicated to respond to a need for precision, which in turn causes a problem of higher manufacturing costs.

As for the amount of light, this optical ranging sensor performs two exposures: the first exposure for detecting a light amount to adjust the light amount of the light emitting device and the next exposure for detecting a light amount for use in measurement. The amount of light become larger as a current passed through the light emitting device is increased. However, since supplying a current beyond a limit size to the light emitting device may lead to destruction of the light emitting device, considerable increase in supply current is not achievable. Because of this, considerable reduction in a lens diameter cannot be made, and therefore downsizing of the ranging sensor is difficult.

SUMMARY OF THE INVENTION

Technical Problem

Accordingly, an object of the present invention is to provide an optical ranging sensor which can implement a large distance measurement range and which can achieve precise detection of an object even when the object is a low reflection object at a long distance within the range. Another object of the invention is to provide an electronic device having such an optical ranging sensor.

Solution to Problem

In order to solve the problem, there is provided, according to an aspect of the present invention, an optical ranging sensor, comprising:

an infrared light emitting device;

a light receiving device placed at a distance from the infrared light emitting device, the light receiving device including a light receiving section, a signal processing section for processing a signal outputted from the light receiving section, an information memory section for storing information included in the signal from the light receiving section, and a signal processing software memory section for storing a software for processing the signal from the light receiving section;

a first light-permeable resin section encapsulating the infrared light emitting device;

a second light-permeable resin section encapsulating the light receiving device;

a light-shielding resin member being in contact with the first light-permeable resin section and the second light-permeable resin section, the light-shielding resin member including a first window through which light from the infrared light emitting device passes and a second window through which light incident into the light receiving device passes;

a drive circuit section for driving the infrared light emitting device;

a light receiving device control section for controlling the light receiving device; and a control section for controlling the drive circuit section to intermittently drive the infrared light emitting device at predetermined intervals and for controlling the light receiving device control section to expose to light or operate the light receiving device in synchronization with a timing of driving the infrared light emitting device.

The light receiving device, which is used for detection of a position, may have, for example, a CMOS area sensor of m rows×n columns as a position detecting light receiving section. The light receiving device may include, for example, a position detecting light receiving section, a circuit section for processing signals outputted from the position detecting light receiving section, a signal processing software memory section, and an information memory section (constituted from a flash memory, an e-Fuse and an OTM (One Time Memory) etc.), each section of the light receiving device and the drive circuit section being structured to be included in one chip. The drive circuit section may be included not in the chip which includes each section of the light receiving device. For example, the drive circuit section may be included in a chip of a light emitting device.

According to the invention, an infrared light emitting device whose wavelength is longer than visible light is used as a light emitting device, so that an influence of disturbance light can be reduced. Since the emission wavelength of the light emitting device is in an infrared region, an influence of light with intensity of indoor fluorescent light can be removed by setting, for example, the reception wavelength of the light receiving device (e.g., a CMOS area sensor is used as a light receiving section) to have peak sensitivity in the infrared range and by structuring a light receiving-side lens and a light emitting-side lens to have an optical property to block visible light.

According to the invention, since the infrared light emitting device is intermittently driven, and furthermore the timing of driving the infrared light emitting device is made to be synchronized with the timing of exposing or operating the light receiving device, electric charges generated by light during light emission can be stored a plurality of times on the light receiving side, so that even in the case where the mount of light received by one light emission is not sufficient for ranging, the insufficient amount of light can be compensated. Therefore, when the light receiving section of the light receiving device is, for example, a CMOS area sensor, light amount distribution of each cell in the light receiving section makes it possible to obtain a precise position of a light amount distribution centroid, and therefore a relative position from a predetermined position of the light receiving section to the light amount centroid position can be obtained with precision. Therefore, it becomes possible to obtain a signal having precise information about a distance to a measurement target based on the relative position, by which precise ranging can be performed.

In one embodiment, the control section alternately performs a first control for continuously driving the infrared light emitting device in each of predetermined first periods and for controlling the light receiving device control section to continuously expose or operate the light receiving device in synchronization with a timing of continuously driving the infrared light emitting device, and a second control for stopping the infrared light emitting device in each of predetermined second periods and for controlling the light receiving device control section to continuously expose or operate the light receiving device for a time generally identical to a time for which the infrared light emitting device is continuously driven in the first control. And, a distance is measured based on a difference between a signal coming from the light receiving device during the first control and a signal coming from the light receiving device during the second control.

In the case of using an optical ranging sensor under environments of light including infrared light such as incandescent lamp light and sunlight, detection is successfully performed if the illuminance of the incandescent lamp and sunlight is low and ambient light which comes incident into the light receiving section of the light receiving device when light emission is not performed is small, whereas if the ambient light is large, noise of the light receiving signal by the ambient light is large, which may hinder precise detection of light from the light emitting section.

According to the embodiment, since the size of a noise signal based on ambient light can be detected by the second control, the noise signal of the ambient light in the second control is subtracted from a signal composed of a signal representing information on a distance to an object and the noise signal of the ambient light in the first control, so that only the signal representing the information on the distance to an object can be taken out. Therefore, even when the ranging sensor is used under the environments of light including infrared light such as incandescent lamp light and sunlight, ranging can be performed with precision.

That is, an influence of ambient light can be removed by coinciding a driving time of the infrared light emitting device at a specified timing with an exposing or operating time of the light receiving device, and further by exposing or operating the light receiving device side for a period of time identical to the exposing or operating time of the light receiving device during a period of time in which the infrared light emitting device is not driven, so that an output difference between these two exposing or operating times can be used as a signal.

In one embodiment, the control section performs a third control for stopping driving of the infrared light emitting device for a predetermined time and for controlling the light receiving device control section to continuously expose or operate the light receiving device. Also, the control section controls sensitivity and/or either of exposure or operating time of the light receiving device based on a signal coming from the light receiving device during the third control.

When the amount of ambient light is large, the output level of the light receiving section may be saturated only with the ambient light.

According to the invention, an ambient light level can be detected based on a signal coming from the light receiving device during the third control prior to detection of a signal representing information on a distance. Therefore, since the sensitivity of the light receiving device can be changed in response to the ambient light level, and the number of light emissions on the light emitting side and the number of exposures or operations on the light receiving side can be increased or decreased in response to the ambient light level, precise ranging can be performed under optimal conditions corresponding to the ambient light. That is, prior to light emission of the infrared light emitting device and exposure or operation of the light receiving device at a predetermined timing, only the exposure or operation of the light receiving device is executed at a predetermined time to detect ambient illuminance for controlling the light receiving sensitivity and the exposing or operating time of the light receiving device, so that precise ranging can be performed under optimal conditions corresponding to ambient light.

In one embodiment, the control section performs the third control in each of predetermined third periods before performing the first control and the second control, and alternately performs the third control and a control composed of the first control and the second control.

According to the embodiment, the third control and a control composed of the first control and the second are alternately performed, and therefore when the ambient light level changes during ranging operation, precise ranging can be performed without being influenced by change in ambient light. That is, even when the ambient light level changes during the ranging operation, precise ranging can be performed without being influenced by change in ambient light by detecting ambient illuminance once at every cycle of ranging.

In one embodiment, the control section detects illuminance of ambient light based on a signal coming from the light receiving device during the third control, and when the detected ambient illuminance is smaller than predetermined illuminance, the control section increases the sensitivity of the light receiving device and decreases a number of light emissions by the infrared light emitting device and a number of light receptions by the light receiving device.

For example, when the detected ambient illuminance is in the indoor illuminance level, increasing the light receiving sensitivity and reducing the number of light emissions and receptions allow sufficient and precise ranging.

According to the embodiment, precise ranging can be performed under optimum conditions corresponding to ambient light.

In one embodiment, the control section detects illuminance of ambient light based on a signal coming from the light receiving device during the third control, and when the detected ambient illuminance is larger than a predetermined illuminance, the control section decreases the sensitivity of the light receiving device and increases a number of light emissions by the infrared light emitting device and a number of light receptions by the light receiving device.

For example, when the detected ambient illuminance is in the outdoor illuminance level, decreasing the light receiving sensitivity and increasing the number of light emissions and receptions allow sufficient and precise ranging.

According to the embodiment, precise ranging can be performed under optimum conditions corresponding to ambient light.

In one embodiment, the light receiving section, the signal processing circuit section, the signal processing software memory section, and the information memory section (e.g., flash memory section) of the light receiving device are included in one chip together with the drive circuit section.

In one embodiment, the optical ranging sensor has a lens casing having a light emitting-side lens and a light receiving-side lens and a distance to an object is detected by a triangulation method.

An electronic device according to the present invention comprises the optical ranging sensor.

Examples of the electronic device include personal computers and mobile phones.

According to the invention, precise ranging can be performed by the optical ranging sensor.

Advantageous Effects of Invention

According to the optical ranging sensor of the invention, for example, in the mode of ranging with use of a triangulation system, it becomes possible to achieve a wide ranging range, to implement precise detection of even a low reflection object on the long distance side within the range, and to achieve downsizing, higher performance, reduced electric current consumption and reduced manufacturing costs.

If the optical ranging sensor is mounted on a personal computer, the personal computer can detect a person who is in front of the personal computer, and therefore when the person is away from the personal computer for example, the personal computer can be switched into sleep mode, so that energy saving can be implemented. If the sensor is mounted on a cell phone incorporating a camera, a precise distance to a subject can be measured, so that it becomes possible to implement auto-focusing function (to focus the camera automatically) driven at high speed.

BRIEF DESCRIPTION OF DRAWINGS

The present invention will become more fully understood from the detailed description given hereinbelow and the accompanying drawings which are given by way of illustration only, and thus are not intended to limit the present invention, and wherein.

DESCRIPTION OF EMBODIMENTS

Figure 1:
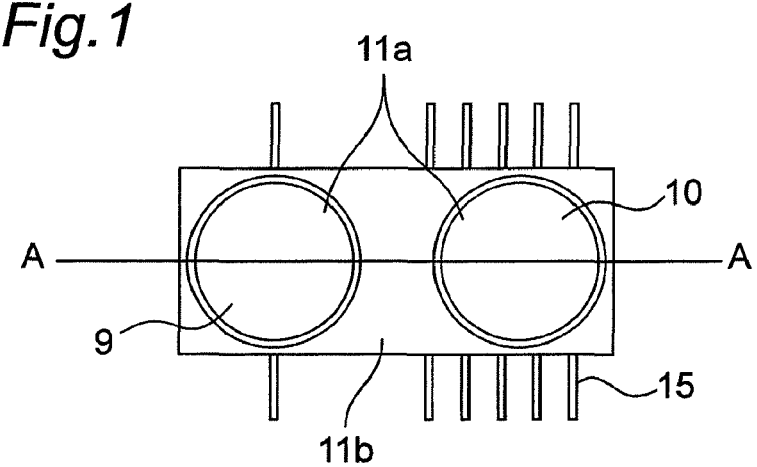
FIG. 1 is a top view of an optical ranging sensor in one embodiment of the invention.
Figure 2:
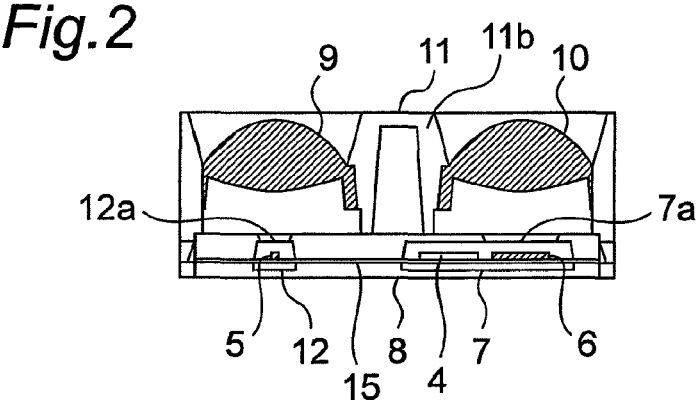
FIG. 2 is a cross sectional view of FIG. 1 taken along an A-A line.

FIG. 1 is a top view of an optical ranging sensor in one embodiment of the invention, and FIG. 2 is a cross sectional view of FIG. 1 taken along an A-A line.

As shown in FIG. 2, the optical ranging sensor includes a lead frame 15, an IC 4 as an example of the control section, an infrared light emitting diode (hereinafter referred to as an infrared LED) 5 as an example of the infrared light emitting device, a light receiving device 6, a first light-permeable resin section 12, a second light-permeable resin section 7, a light-shielding resin member 8 and a lens casing 11. The IC 4, the infrared LED 5 and the light receiving device 6 are mounted on the lead frame 15 and placed on one plane.

The infrared LED 5 emits infrared rays. The infrared LED 5 is encapsulated in the epoxy-based first light-permeable resin section 12 by transfer molding, while the light receiving device 6 is encapsulated in the epoxy-based second light-permeable resin section 7 by transfer molding. The encapsulated infrared LED 5 and the encapsulated light receiving device 6 each form one chip. The infrared LED 5 and the light receiving device 6 are placed side by side at an interval. The IC 4 is encapsulated in the second light-permeable resin section 7 together with the light receiving device 6. The first and second light-permeable resin sections 12 and 7 may be made of a same resin material or made of different resin materials.

The light-shielding resin member 8 integrally molds the first light-permeable resin section 12 and the second light-permeable resin section 7 by injection molding. The light-shielding resin member 8 has a first window 12a and a second window 7a, which are arranged such that light from the infrared LED 5 passes the first window 12a, and that light which will enter a later-mentioned CMOS area sensor 6a (see FIG. 3) of the light receiving device 6 passes the second window 7a.

The lens casing 11 is composed of a lens section 11a and a case section 11b. The lens section 11a has a light emitting-side lens 9 and a light receiving-side lens 10. In the lens casing 11, the lens section is molded from acrylic resin or polycarbonate resin which is made of visible light shielding material, while the case section is molded from ABS resin or polycarbonate resin. The lens section and the case section are dual-molded into a single body. Each of axes of the light emitting-side lens 9 and the light receiving-side lens 10 is directed in a direction normal to the aforementioned one plane.

Figure 3:
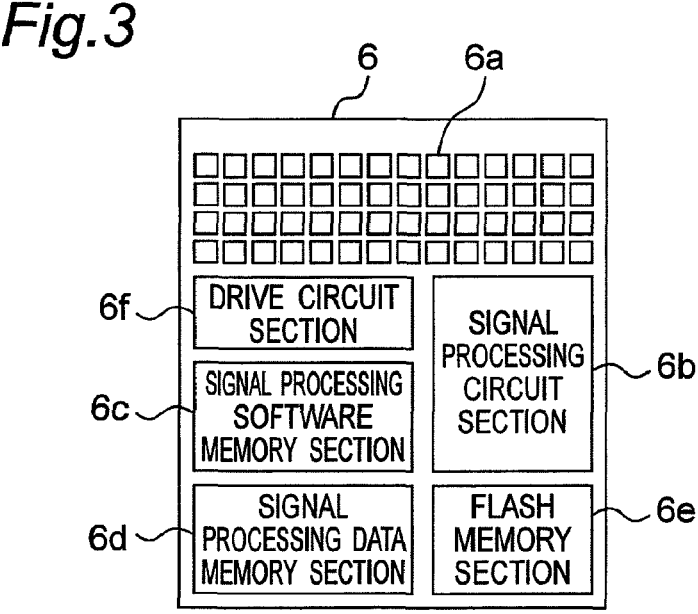
FIG. 3 is a top view of a light receiving device.

FIG. 3 is a top view of the light receiving device 6.

As shown in FIG. 3, the light receiving device 6 includes a CMOS (Complementary Metal Oxide Semiconductor) area sensor (hereinafter referred to as a sensor) 6a having cells in m rows×n columns as an example of the light receiving section, a signal processing circuit section 6b, a signal processing software memory section 6c, a signal processing data memory section 6d, and a flash memory section 6e as an example of the information memory section, all the sections being placed in one chip. A drive circuit section 6f for driving the infrared LED 5 is also included in the chip of the light receiving device 6. The signal processing software memory section 6c contains stores software for processing signals outputted from the sensor 6a. The flash memory section 6e stores signals outputted from the sensor 6a as digital signals. Although a flash memory is used as the information memory section in the present embodiment, memories other than the flash memory such as an E-Fuse, an OTM (One Time Memory), etc. may be used in place of the flash memory as the information memory section in the invention. The signal processing data memory section 6d is configured to store data calculated in the process of signal processing.

The sensor 6a is adapted to detect a position by light reception. The signal processing circuit section 6b is made to process signals outputted from the sensor 6a. The drive circuit section 6f drives the infrared LED 5 at a predetermined timing.

In the invention, an emission time of the infrared LED 5 is controlled and also an exposure time of the sensor 6a is controlled in order to acquire a signal strong enough to detect a relatively long-distance (around meters) low reflection object with a lens diameter shortened.

The optical ranging sensor is arranged and configured to detect a distance to an object by a triangulation method. More specifically, with a detection object being at a position, a light spot centroid position on the sensor 6a is determined by obtaining the position of a light amount distribution centroid from the light amount distribution of the cells in the sensor 6a. Further, a relative position from a given position of the sensor 6a to the light amount centroid position is obtained and a signal to be outputted is processed based on the obtained relative position, so that a distance to the detection object is detected through the processing of the signal. In this case, if the amount of light is not sufficient, it is impossible to obtain the position of the light amount distribution centroid from the light amount distribution of each cell of the sensor 6a.

Figure 4:
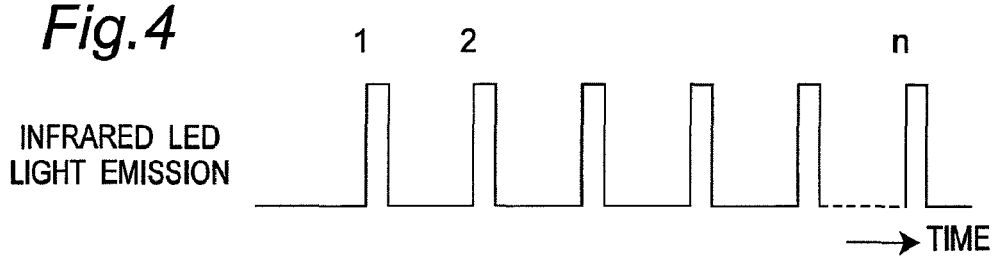
FIG. 4 is a chart showing a relation between the amount of light emitted from a light emitting device and time.
Figure 5:
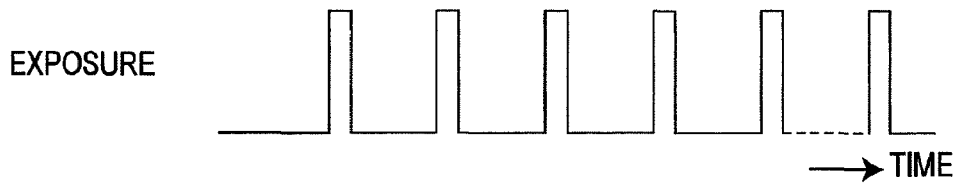
FIG. 5 is a chart showing a relation between the amount of light to which the light receiving device was exposed and time.

FIG. 4 shows a relation between the amount of light emitted from the infrared LED 5 and time, and FIG. 5 shows a relation between the amount of exposure to light (exposure of the sensor 6a) and time. In this embodiment, as shown in FIG. 4 and FIG. 5, the timing of light emission by the infrared LED 5 driven by the drive circuit section 6f is synchronized with the timing of reception by the sensor 6a of the light reflected by a detection object.

Figure 16:
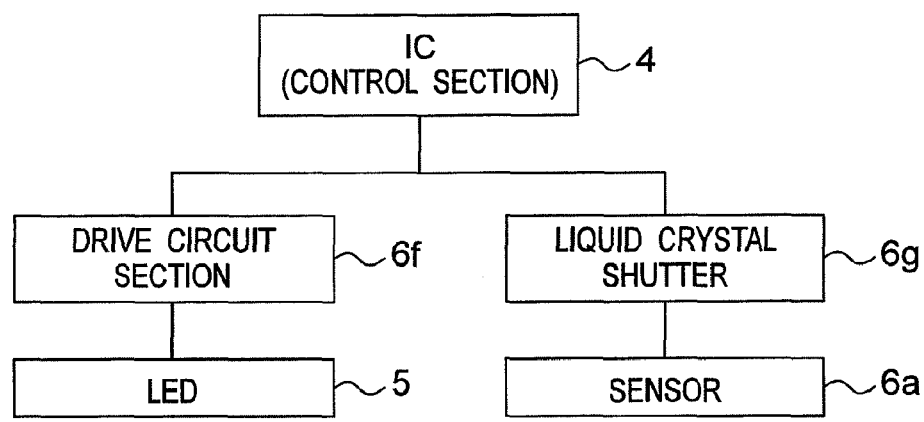
FIG. 16 is a block diagram showing an example of a control section, a drive circuit section and a light receiving device control section in the invention.

This synchronization can be conducted in the following procedures for example. A liquid crystal shutter as an example of the light receiving device control section for opening and closing the second window 7a of the light receiving device 6 is mounted on the light receiving device 6 of the optical ranging sensor (not shown in FIG. 3). As shown in FIG. 16, signals are simultaneously outputted from the IC 4 to the drive circuit section 6f and to the liquid crystal shutter 6g at the same timing, so that the infrared LED 5 is driven and at the same time the sensor 6a of the light receiving device 6 is exposed to light. In this example, the light receiving device 6 is exposed only for a predetermined time. This control by the IC 4 constitutes a first control.

Figure 17:
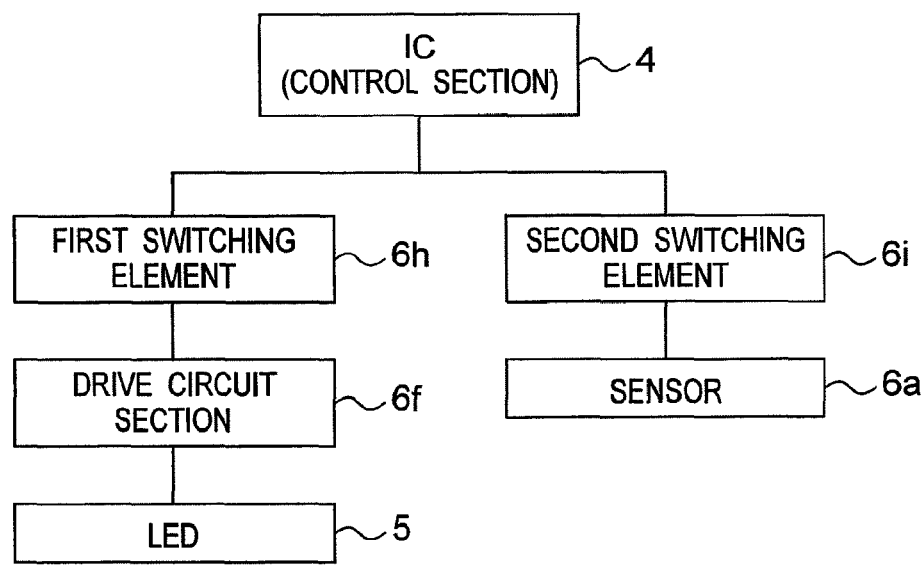
FIG. 17 is a block diagram showing an example of a control section, a drive circuit section and a light receiving device control section in the invention.

Alternatively, the signals shown in FIG. 4 and FIG. 5 may also be acquired as described in the following procedures for example. A first switching element for controlling the feeding of electric power to the infrared LED 5 and a second switching element as an example of the light receiving device control section for controlling the sensor 6a to be active or inactive are mounted on the light receiving device 6 of the optical ranging sensor (not shown in FIG. 3). As shown in FIG. 17, control signals are simultaneously outputted from the IC 4 to the two switching elements 6h and 6i at the same timing, so that the timing of light emission by the infrared LED 5 driven by the drive circuit section 6f is synchronized with the timing of reception by the sensor 6a of the light reflected by a detection object. In this example, the sensor 6a is exposed to light on a constant basis, whereas output signals are activated only at a predetermined time. In this example, the light receiving device 6 operates only at a predetermined time. This control by the IC 4 constitutes a first control.

In this embodiment, as shown in FIG. 4, under control of the IC 4, the infrared LED 5 is intermittently driven by the drive circuit section 4f at regular time intervals as an example of the predetermined intervals. Thus, electric charges generated by emission light are stored a plurality of times on the light receiving side, so that the amount of light which may be insufficient by only one light emission is compensated. This makes it possible to acquire a light amount necessary for obtaining the position of a light amount distribution centroid from the light amount distribution of the cells of the sensor 6a although the ranging time (ranging period) is prolonged. This system is effective when there is almost no ambient light.

Next, when there is ambient light, light other than the light from the infrared LED 5 comes incident into the light receiving section, and therefore the light other than the light from the infrared LED 5 needs to be removed.

In an embodiment in which light other than the light from the infrared LED 5 is removed, the light receiving sensitivity to the infrared rays of the sensor 6a, which is a light receiving section, is increased and the light emitting-side lens 9 and the light receiving-side lens 10 are made of materials having an optical property of blocking visible light. In this embodiment, precise ranging can be performed without being influenced by the light with intensity of indoor fluorescent light.

Description is now given of an embodiment preferable for use under environments of light including infrared light such as incandescent lamp light and sunlight.

Figure 6:
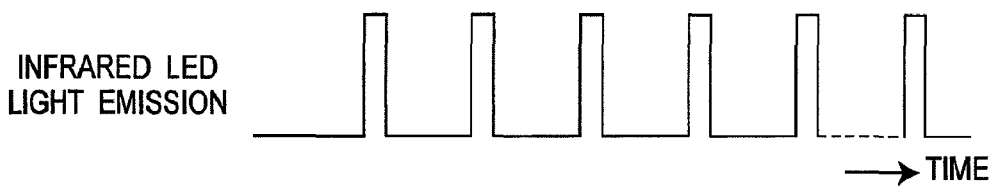
FIG. 6 is a chart showing a relation between the amount of light emitted from the light emitting device and time.
Figure 7:
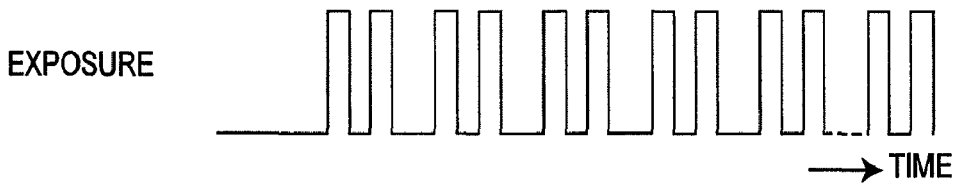
FIG. 7 is a chart showing a relation between the amount of light for exposure and time.

FIG. 6 shows a relation between the amount of light emitted from the infrared LED 5 and time, and FIG. 7 shows a relation between the amount of exposure to light (exposure of a CMOS area sensor) and time.

In the embodiment shown in FIG. 6 and FIG. 7, a first control is performed in which a driving time of the infrared LED 5 and an exposure time of the light-receiving side are set at a predetermined and same timing, while at the same time, a second control is further performed in which the light-receiving side is exposed for a period of time identical to the exposure time set at the predetermined and same timing, during a period of time in which the infrared LED 5 is not driven. Then, an output difference between an output based on the exposure when driving the infrared LED 5 and an output based on the exposure when not driving the infrared LED 5 is obtained for use as a signal.

Figure 8:
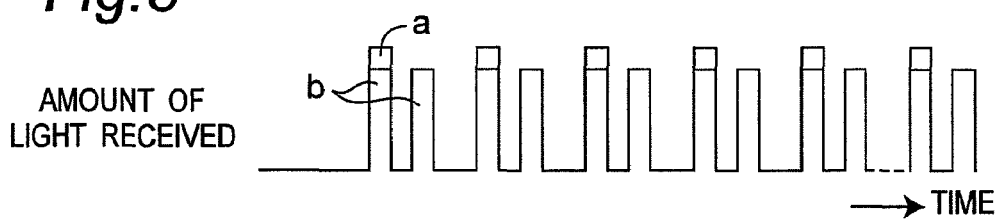
FIG. 8 is a chart for visually showing the amount of signal light.

The amount of light to which the light receiving side is exposed for a period of time in which the infrared LED 5 is driven (generally 100 to 200 μsec) is a sum of light 'a' which is the light emitted by the infrared LED 5 and reflected by a detection object before entering the sensor 6a and light 'b' which is ambient light entering the sensor 6a as shown in FIG. 8. The amount of light to which the light receiving side is exposed for a period of time in which the infrared LED 5 is not driven (about 100 to 200 μsec, which is substantially identical to the period of time for driving the light emitting device) is constituted of only the light 'b' which is ambient light incident into the sensor 6a. Therefore, as visually shown in FIG. 8, a difference in these light amounts corresponds to the amount of the signal light 'a'.

Figure 9:
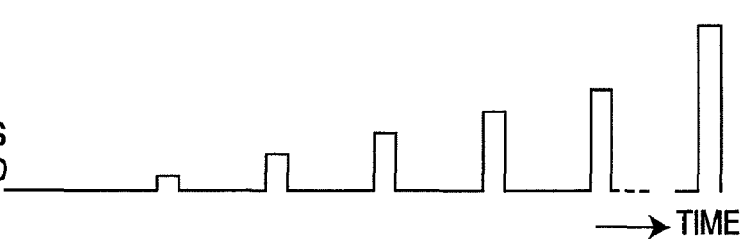
FIG. 9 is a chart showing a relation between the accumulation of differences between amounts of light received and the time.
Figure 10A:
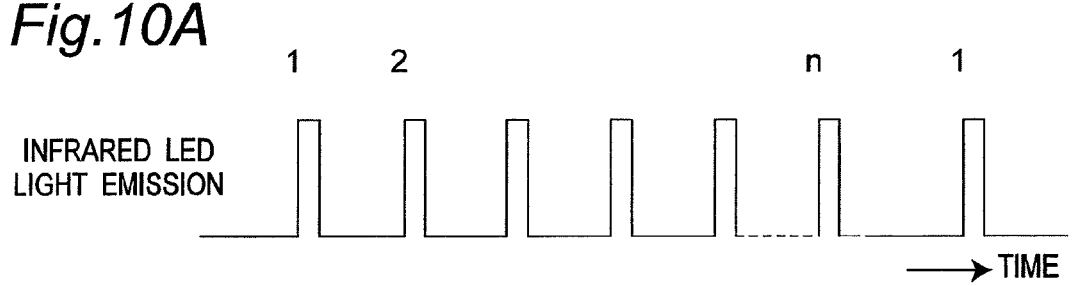
FIGS. 10A, 10B, 10C and 10D are charts for explaining an embodiment in which exposure process is performed for detection of ambient light before execution of a first storage of the signal light amount.
Figure 10B:
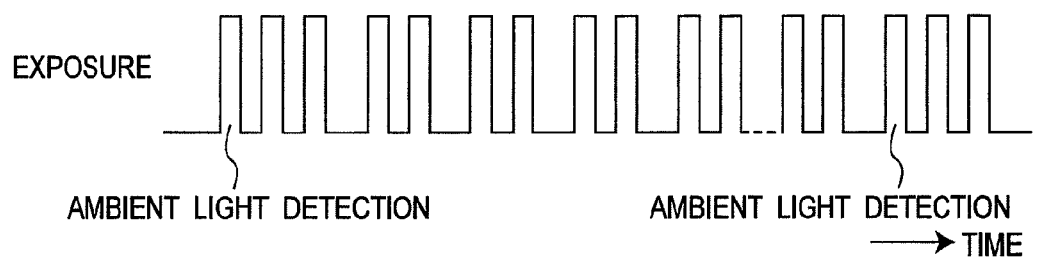
Figure 10C:
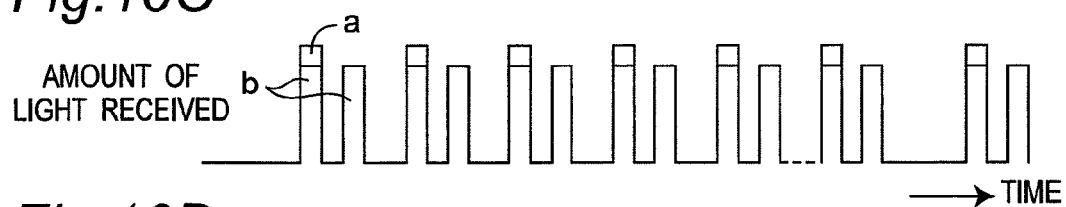
Figure 10D:
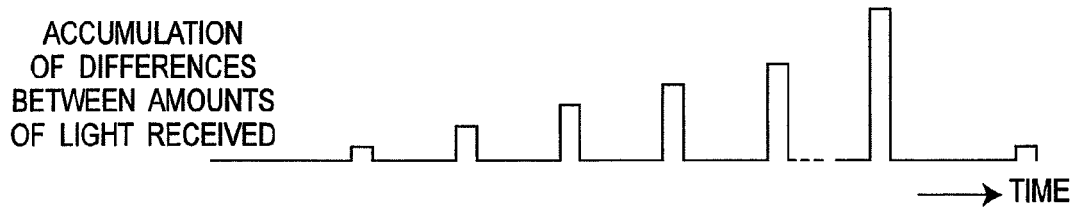

FIG. 9 shows a relation between the accumulation (stored amount) of differences between amounts of light received and the time.

Since the amount of the signal light 'a' obtained by one operation with respect to the light amount difference is small, precise ranging may not be performed successfully. In this case, as shown in FIG. 9, the amount of the signal light 'a' obtained by one operation is repeatedly stored. Thus, it becomes possible to remove the influence of ambient light and then acquire the light amount necessary for obtaining the position of a light amount distribution centroid on the CMOS area sensor.

Description is now given of an embodiment preferable when the amount of ambient light is very large.

When the amount of ambient light is very large, the sensor 6a may be saturated only with the ambient light. Accordingly, as shown in FIGS. 10A to 10D, exposure is performed for detection of ambient light before execution of the first storage of the signal light amount so as to detect the ambient light level. In response to the detected level, the sensitivity of the sensor 6a is changed and further, the number of light emissions and the number of exposures on the light receiving side are increased or decreased. Thus, precise ranging is performed under optimum conditions corresponding to ambient light.

Figure 11:
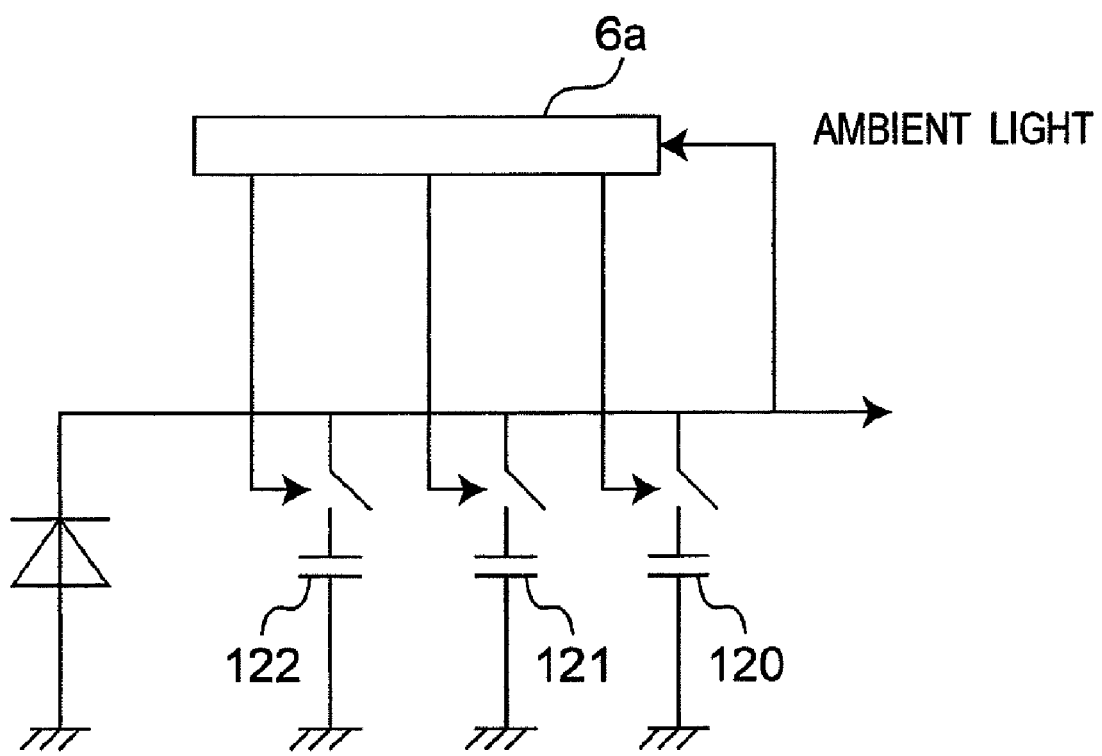
FIG. 11 shows a part of a charge storage section.
Figure 12:
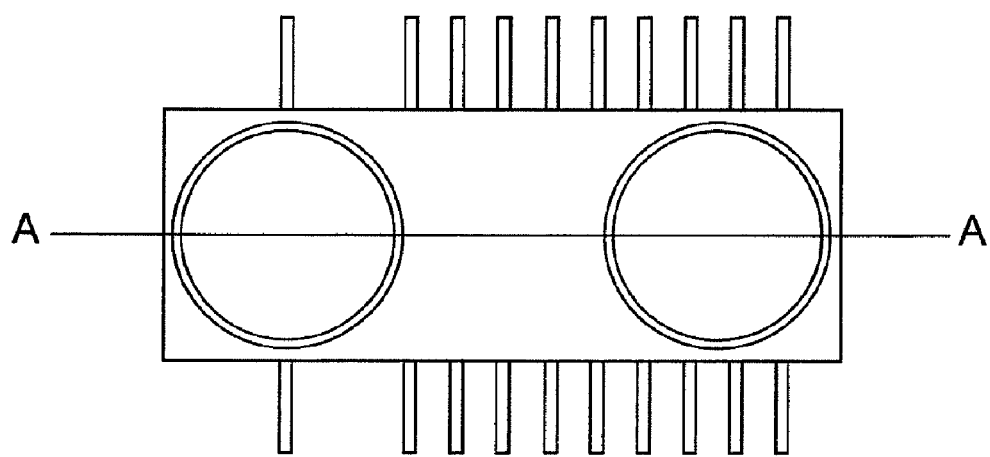
FIG. 12 is a view for explaining a conventional optical ranging sensor.
Figure 13:
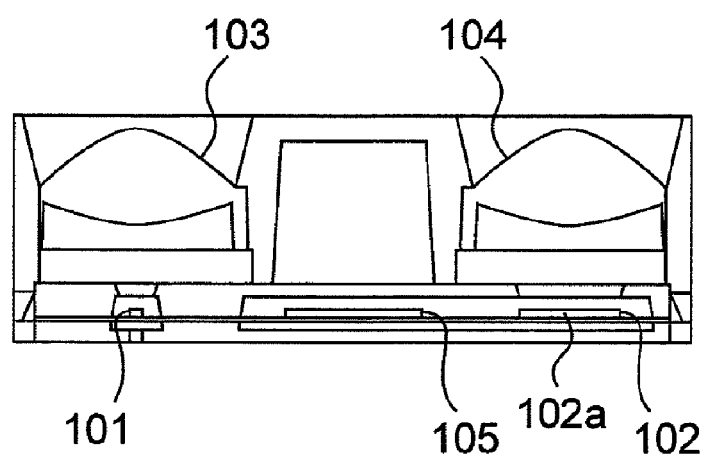
FIG. 13 is a view for explaining the conventional optical ranging sensor.

More specifically, the ambient light level is measured before the ranging operation is performed, and if the measured value is small (illuminance of about 600 lx or less), then the sensitivity of the sensor 6a is set higher. This is achieved by, for example, decreasing the combined capacitances of capacitors denoted by reference signs 120, 121 and 122 in a part of the charge storage section shown in FIG. 11. The decrease in the combined capacitances of the capacitors can be achieved by, for example, reducing the number of the capacitors for use by means of switches. Further, the ranging operation is performed with the number of light emissions relatively decreased. (Of course the number of light emissions to be employed here may be the same as that employed in a next-described case in which the sensitivity is decreased.)

If the measured value is large (illuminance of about 600 to 10000 lx), the sensitivity of the sensor 6a is set to be lower. This is achieved by, for example, increasing the combined capacitances of capacitors denoted by reference signs 120, 121 and 122 in a part of the charge storage section shown in FIG. 11. The increase in the combined capacitances of the capacitors can be achieved by, for example, increasing the number of the capacitors for use by means of switches. Further, the ranging operation is performed with the increased number of light emissions. The sensitivity is lowered so as to avoid saturation, and a signal required for ranging is stored a plurality of times (about 10 to 30 times) in proportion as the lowered sensitivity to achieve the required level. The control for detecting the ambient light level constitutes a third control.

In one example, as for the sensitivity level switching due to the amount of ambient light, the sensitivity with the presence of small ambient light amount is set at about 20 times larger than that with the presence of large ambient light amount.

As shown in FIGS. 10A to 10D, the operation of measuring the ambient light level prior to the ranging operation is performed once a ranging period. Thus, even when the ambient light level changes during a ranging operation, the subsequent ranging operations can be performed under optimum conditions in response to the latest ambient light level.

Increasing the ambient light levels from two to three allows comprehensive and precise optimization of the number of light emissions and the number of exposures, so that the shortest ranging period can be realized. For example, when the ambient light amount is divided into three levels of 0 to 300 lx, 300 to 600 lx, and 600 to 10000 lx, the sensitivity of the sensor for the ambient light level of 0 to 300 lx can be set twice as large as that for the level of 600 lx or less in the case of two ambient light levels being set. In this way, the number of light emissions can be reduced by half, and the time necessary for the ranging operation can also be cut by half.

Thus, controlling the exposure time of the light receiving side and the sensitivity of the light receiving device 6 makes it possible to downsize the ranging sensor and to precisely measure the distance to a long-distance low reflection object. Extending the exposure time allows use of inexpensive light emitting devices with small luminous efficiency, which results in cost reduction of the ranging sensor. Moreover, the light emitting amount of an infrared light emitting device with high light emitting efficiency can be reduced by extending the exposure time, so that a current flowing through the infrared light emitting device can be reduced, and thereby consumption current of the ranging sensor can be reduced.

Figure 15:
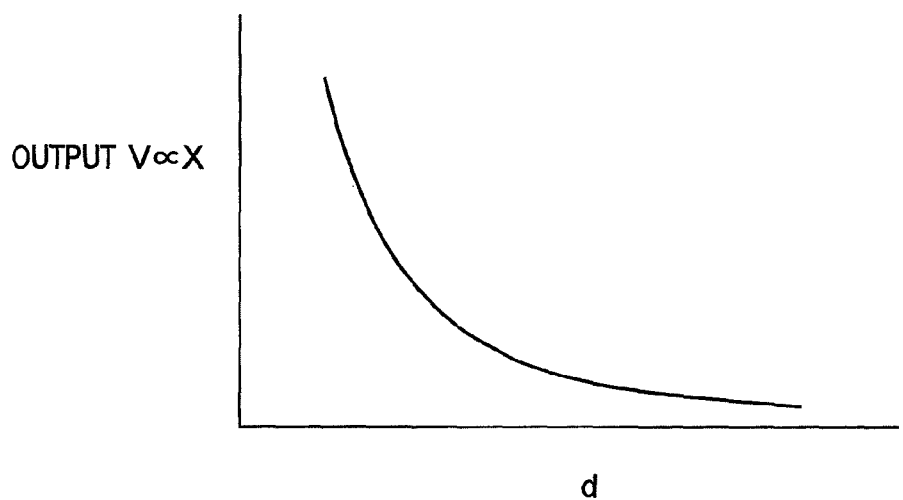
FIG. 15 is a graph for explaining the principle of the triangulation system.

As already described above, the distance d to an object which is present in a certain range is detected by the triangulation method in this embodiment. As explained with reference to FIG. 15, in the optical ranging sensor which detects the distance d to an object by the triangulation method, the distance d to the object is in reverse proportion to the output.

Figure 14:
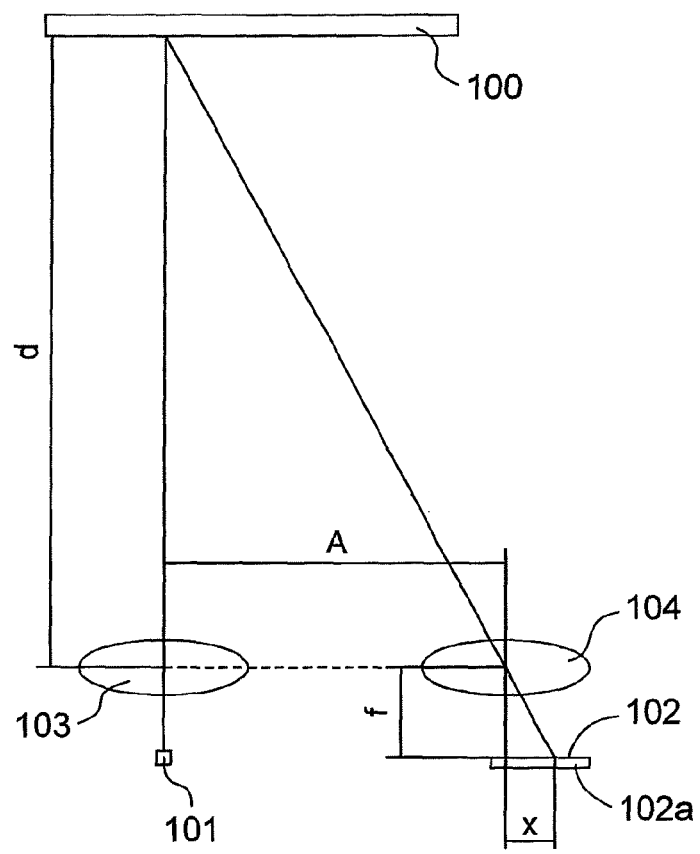
FIG. 14 is an illustration for explaining the principle of the triangulation system.

That is, when the distance to the object is short, change in the output due to distance fluctuation is large, whereas when the distance to the object is long, change in the output due to distance fluctuation becomes small. Therefore, in order to perform ranging of a long-distance object, a suitable amount of light is needed. In this regard, there is a method of increasing a lens diameter, though the increase in the lens diameter entails increase in the distance A (see FIG. 14) between the center of a light emitting-side lens and the center of a light receiving-side lens as well as increase in a focal length f of the light receiving-side lens (i.e., a distance between the light receiving-side lens and the light receiving device), which results in increase in size of the optical ranging sensor.

In such a background, as for preferable parameters for applying the optical ranging sensor to body detection by a personal computer (if presence of a human body in front of the personal computer is not detected, control such as turning off the monitor is executed to achieve energy saving) and to auto-focusing of a camera in mobile phones, the distance A between the center of the light emitting-side lens and the center of the light receiving-side lens may preferably be about 10 mm or less, and the focal length f of the lens may preferably be about 5 mm or less.

In this embodiment, a suitable amount of light necessary for executing ranging of a long-distance object can be obtained even when output change by distance fluctuation is small, and therefore these preferable parameters can be implemented.

In the above embodiment, although the infrared LED 5 was encapsulated in the first light-permeable resin section 12 and the light receiving device 6 was encapsulated in the second light-permeable resin section 7 which was formed separately from the first light-permeable resin section 12, a first transparent resin section for encapsulating an infrared light emitting device and a second transparent resin section for encapsulating a light receiving device may be a single body in this invention.

In the disclosed embodiment, the infrared LED 5 was intermittently driven at the same time intervals in the first control, while the sensor 6a was intermittently exposed at the same time intervals in each of the first, second and third controls. However, in the invention, the infrared light emitting device may intermittently be driven at time intervals which are not consistent, and the light receiving device may intermittently be exposed at time intervals which are not consistent at least in any one of the first, second and third controls. It should naturally be understood that the exposure time of the first control and the second control should be identical, whereas the exposure time of the first control and the third control may be different. It also should naturally be understood that in the invention, the exposure time of the first control and the second control, which make a pair (i.e., a pair of controls to provide a signal difference from the respective light receiving devices), should be identical, whereas the exposure time of a pair of the first control and the second control may be different from the exposure time of another pair of the first control and the second control.

Although the infrared light emitting device was an infrared LED 5 in the disclosed embodiment, the infrared light emitting device may be an infrared light emitting laser device in the invention.

Although the light receiving device 6 was exposed for a predetermined time in the above embodiment, the light receiving device may constantly be exposed and then be operated (activated) only at a predetermined time instead of being exposed for a predetermined time as disclosed in the invention.

Although the sensor 6a and the drive circuit section 6f of the infrared LED 5 were included in the light receiving device 6 and included in one chip in the disclosed embodiment, both the light receiving device and the drive circuit section of the infrared light emitting device do not need to be included in one chip. For example, the drive circuit section of the infrared light emitting device may be included in one chip together with the infrared light emitting device, or it may be mounted in another chip.

Since the CMOS image sensor (area image sensor having a pixel section configured by CMOS process) 6a is used as a light receiving section of the light receiving device 6 in this embodiment, the CMOS image sensor can easily be chipped together with peripheral circuits and a signal processing section, so that voltage reduction and low power consumption can be achieved.

If the optical ranging sensor of the invention is mounted on electronic devices such as personal computers and mobile phones, precise ranging can be performed while voltage reduction and low power consumption can be achieved.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 5 infrared LED
6 light receiving device
6a sensor
6b signal processing circuit section
6c signal processing software memory section
6d data memory section
6e flash memory section
6f drive circuit section
7 light-permeable resin section
7a window
8 light-shielding resin member
9 light emitting-side lens
10 light receiving-side lens
11 lens casing
12 light-permeable resin section
12a window
15 lead frame

The invention claimed is:
1. An optical ranging sensor, comprising:
an infrared light emitting device;
a light receiving device placed at a distance from the infrared light emitting device, the light receiving device including a light receiving section, a signal processing section for processing a signal outputted from the light receiving section, an information memory section for storing information included in the signal from the light receiving section, and a signal processing software memory section for storing a software for processing the signal from the light receiving section;
a first light-permeable resin section encapsulating the infrared light emitting device;
a second light-permeable resin section encapsulating the light receiving device;

a light-shielding resin member being in contact with the first light-permeable resin section and the second light-permeable resin section, the light-shielding resin member including a first window through which light from the infrared light emitting device passes and a second window through which light incident into the light receiving device passes;

a drive circuit section for driving the infrared light emitting device;

a light receiving device control section for controlling the light receiving device; and a control section for controlling the drive circuit section to intermittently drive the infrared light emitting device at predetermined intervals and for controlling the light receiving device control section to expose to light or operate the light receiving device in synchronization with a timing of driving the infrared light emitting device, wherein the control section configured to perform:

a first control for continuously driving the infrared light emitting device in each of predetermined first periods and for controlling the light receiving device control section to continuously expose or operate the light receiving device in synchronization with a timing of continuously driving the infrared light emitting device;

a second control for stopping the infrared light emitting device in each of predetermined second periods and for controlling the light receiving device control section to continuously expose or operate the light receiving device for a time generally identical to a time for which the infrared light emitting device is continuously driven in the first control; and measuring a distance based on a difference between a signal coming from the light receiving device during the first control and a signal coming from the light receiving device during the second control, and wherein the measured distance is between the infrared light emitting device and an object reflecting light emitted by the infrared light emitting device.

2. The optical ranging sensor as claimed in claim 1 wherein the control section is configured to perform a third control for stopping driving of the infrared light emitting device for a predetermined time and further configured to control the light receiving device control section to continuously expose or operate the light receiving device, and wherein the control section is configured to control sensitivity and/or either of exposure or operating time of the light receiving device based on a signal coming from the light receiving device during the third control.

3. The optical ranging sensor as claimed in claim 2, wherein the control section is configured to perform the third control in each of predetermined third periods before performing the first control and the second control, and alternately performs the third control and a control composed of the first control and the second control.

4. The optical ranging sensor as claimed in claim 2, wherein the control section is configured to detect illuminance of ambient light based on a signal coming from the light receiving device during the third control, and when the detected ambient illuminance is smaller than predetermined illuminance, the control section is further configured to increase the sensitivity of the light receiving device and decreases a number of light emissions by the infrared light emitting device and a number of light receptions by the light receiving device.

5. The optical ranging sensor as claimed in claim 2, wherein the control section is configured to detect illuminance of ambient light based on a signal coming from the light receiving device during the third control, and when the detected ambient illuminance is larger than a predetermined illuminance, the control section is further configured to decrease the sensitivity of the light receiving device and increases a number of light emissions by the infrared light emitting device and a number of light receptions by the light receiving device.

6. A personal computer comprising the optical ranging sensor as claimed in claim 1.

7. A mobile phone comprising the optical ranging sensor as claimed in claim 1.

* * * * *